(12) United States Patent
Schumacher et al.

(10) Patent No.: US 11,996,692 B2
(45) Date of Patent: *May 28, 2024

(54) PRIORITIZED POWER DELIVERY FOR FACILITATING TRANSPORT CLIMATE CONTROL

(71) Applicant: THERMO KING LLC, Minneapolis, MN (US)

(72) Inventors: Ryan Wayne Schumacher, Bloomington, MN (US); Michael James Vanous, Minneapolis, MN (US); Mark D. Leasure, Eagan, MN (US); Nicholas Allan Cregan, Roseville, MN (US); Matt Srnec, Minnetonka, MN (US); Alessandro Silvestri, Barcelona (ES)

(73) Assignee: THERMO KING LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,994

(22) Filed: Jun. 27, 2023

(65) Prior Publication Data

US 2023/0344234 A1    Oct. 26, 2023

Related U.S. Application Data

(63) Continuation of application No. 17/015,194, filed on Sep. 9, 2020, now Pat. No. 11,695,275.

(30) Foreign Application Priority Data

Sep. 9, 2019   (EP) ..................... 19382776

(51) Int. Cl.
*B60H 1/00*    (2006.01)
*B60L 1/00*    (2006.01)
(Continued)

(52) U.S. Cl.
CPC ............ *H02J 3/32* (2013.01); *B60H 1/00428* (2013.01); *B60L 1/00* (2013.01); *B60L 53/14* (2019.02)

(58) Field of Classification Search
CPC .......... B60L 1/00; B60L 1/02; B60L 2200/18; B60L 2200/36; B60L 53/14; Y02T 10/70;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Mussa A Shaawat
(74) *Attorney, Agent, or Firm* — HSML P.C.

(57) ABSTRACT

Technologies are described herein to prioritize delivery of power to electrical components associated with a vehicle and an electrically powered accessory. A power distribution unit may assess real-time power needs for the electrical storage system associated with the vehicle and electrical storage device of the electrically powered accessory and direct incoming power to the electrical storage system (Continued)

associated with the vehicle and the electrical storage device of the electrically powered accessory based on a prioritization of various factors.

15 Claims, 8 Drawing Sheets

(51) Int. Cl.
*B60L 53/14* (2019.01)
*H02J 3/32* (2006.01)

(58) Field of Classification Search
CPC ..... Y02T 10/7072; Y02T 10/88; Y02T 90/14; B60H 1/00428; B60H 1/00385; B60H 1/3232; H02J 3/32; H02J 4/00; H02J 2310/60
See application file for complete search history.

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,796,367 B2 * | 9/2004 | Blacquiere | B60H 1/00428 165/41 |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 * | 10/2012 | Wordsworth | B60H 1/3232 700/297 |
| 8,381,540 B2 | 2/2013 | Alston | |
| 8,441,228 B2 | 5/2013 | Brabee | |
| 8,476,872 B2 | 7/2013 | Truckenbrod et al. | |
| 8,487,458 B2 | 7/2013 | Steele et al. | |
| 8,541,905 B2 | 9/2013 | Brabee | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 * | 6/2014 | Kinser | B60L 53/65 320/109 |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,935,933 B1 * | 1/2015 | Koelsch | B60H 1/00428 62/115 |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabee | |
| 9,147,335 B2 | 9/2015 | Raghunathan et al. | |
| 9,199,543 B2 | 12/2015 | Brabee | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabee | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 * | 5/2018 | Weber | B60L 53/62 |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 11,273,684 B2 * | 3/2022 | Holmstrom | B60H 1/00742 |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0011007 A1 * | 1/2008 | Larson | B60H 1/3232 62/243 |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0153722 A1 | 6/2012 | Nazarian | |
| 2012/0198866 A1 | 8/2012 | Zeidner | |
| 2012/0310416 A1 | 12/2012 | Tepper et al. | |
| 2013/0000342 A1 | 1/2013 | Blasko et al. | |
| 2013/0049677 A1 * | 2/2013 | Bouman | B60L 1/02 320/106 |
| 2013/0088900 A1 | 4/2013 | Park | |
| 2013/0158828 A1 | 6/2013 | McAlister | |

(56) References Cited

U.S. PATENT DOCUMENTS

| | | | |
|---|---|---|---|
| 2013/0204471 A1* | 8/2013 | O'Connell | B60L 53/68 |
| | | | 701/22 |
| 2013/0231808 A1* | 9/2013 | Flath | B60W 20/10 |
| | | | 903/903 |
| 2014/0018969 A1* | 1/2014 | Forbes, Jr. | H02J 3/38 |
| | | | 700/295 |
| 2014/0020414 A1 | 1/2014 | Rusignuolo et al. | |
| 2014/0026599 A1* | 1/2014 | Rusignuolo | F25B 49/025 |
| | | | 62/243 |
| 2014/0060097 A1 | 3/2014 | Perreault | |
| 2014/0137590 A1 | 5/2014 | Chopko et al. | |
| 2014/0230470 A1 | 8/2014 | Cook | |
| 2014/0265560 A1 | 9/2014 | Leehey et al. | |
| 2014/0283533 A1* | 9/2014 | Kurtzman | B60R 16/03 |
| | | | 307/130 |
| 2014/0345301 A1* | 11/2014 | Steele | B60P 3/20 |
| | | | 62/61 |
| 2015/0019132 A1 | 1/2015 | Gusikhin et al. | |
| 2015/0042168 A1* | 2/2015 | Widmer | H02J 50/80 |
| | | | 307/104 |
| 2015/0081212 A1 | 3/2015 | Mitchell et al. | |
| 2015/0121923 A1 | 5/2015 | Rusignuolo et al. | |
| 2015/0168032 A1 | 6/2015 | Steele | |
| 2015/0188323 A1* | 7/2015 | Muralidhar | H02J 7/0071 |
| | | | 320/106 |
| 2015/0188360 A1 | 7/2015 | Doane et al. | |
| 2015/0246593 A1* | 9/2015 | Larson | B60H 1/00428 |
| | | | 62/236 |
| 2015/0280466 A1* | 10/2015 | Owen | B60L 50/51 |
| | | | 320/137 |
| 2015/0316301 A1 | 11/2015 | Kolda et al. | |
| 2015/0345958 A1 | 12/2015 | Graham | |
| 2015/0355288 A1 | 12/2015 | Yokoyama et al. | |
| 2015/0360568 A1 | 12/2015 | Champagne et al. | |
| 2016/0011001 A1 | 1/2016 | Emory et al. | |
| 2016/0035152 A1 | 2/2016 | Kargupta | |
| 2016/0089994 A1 | 3/2016 | Keller et al. | |
| 2016/0252289 A1 | 9/2016 | Feng et al. | |
| 2016/0280040 A1 | 9/2016 | Connell et al. | |
| 2016/0285416 A1 | 9/2016 | Tiwari et al. | |
| 2016/0291622 A1 | 10/2016 | Al-Mohssen et al. | |
| 2016/0327921 A1 | 11/2016 | Ribbich et al. | |
| 2016/0377309 A1 | 12/2016 | Abiprojo et al. | |
| 2017/0030728 A1 | 2/2017 | Baglino et al. | |
| 2017/0057323 A1 | 3/2017 | Neu et al. | |
| 2017/0063248 A1 | 3/2017 | Lee et al. | |
| 2017/0098954 A1 | 4/2017 | Ferguson et al. | |
| 2017/0217280 A1 | 8/2017 | Larson et al. | |
| 2017/0259764 A1 | 9/2017 | Da Silva Carvalho et al. | |
| 2017/0302200 A1 | 10/2017 | Marcinkiewicz | |
| 2017/0349078 A1 | 12/2017 | Dziuba et al. | |
| 2018/0022187 A1 | 1/2018 | Connell et al. | |
| 2018/0029436 A1 | 2/2018 | Zaeri et al. | |
| 2018/0029488 A1 | 2/2018 | Sjödin | |
| 2018/0087813 A1 | 3/2018 | Senf, Jr. | |
| 2018/0111441 A1 | 4/2018 | Menard et al. | |
| 2018/0154723 A1 | 6/2018 | Anderson et al. | |
| 2018/0201092 A1 | 7/2018 | Ahuja et al. | |
| 2018/0203443 A1 | 7/2018 | Newman | |
| 2018/0222278 A1 | 8/2018 | Mizuma | |
| 2018/0306533 A1 | 10/2018 | Alahyari et al. | |
| 2018/0342876 A1 | 11/2018 | Agnew et al. | |
| 2018/0342877 A1 | 11/2018 | Yoo et al. | |
| 2018/0356870 A1 | 12/2018 | Rusignuolo | |
| 2019/0047496 A1 | 2/2019 | Sufrin-Disler et al. | |
| 2019/0086138 A1 | 3/2019 | Chopko et al. | |
| 2019/0092122 A1 | 3/2019 | Vanous et al. | |
| 2019/0123544 A1 | 4/2019 | Pelegris et al. | |
| 2019/0184838 A1* | 6/2019 | Lee | B60L 53/24 |
| 2019/0255914 A1 | 8/2019 | Ikeda et al. | |
| 2019/0283541 A1 | 9/2019 | Adetola et al. | |
| 2020/0050753 A1 | 2/2020 | Davis et al. | |
| 2020/0086712 A1* | 3/2020 | Schumacher | H02J 1/14 |
| 2020/0086744 A1* | 3/2020 | Schumacher | B60L 58/22 |
| 2020/0101820 A1* | 4/2020 | Wenger | B60H 1/0073 |
| 2020/0130471 A1 | 4/2020 | Leasure | |
| 2020/0130473 A1 | 4/2020 | Schumacher et al. | |
| 2020/0136504 A1 | 4/2020 | Schumacher et al. | |
| 2020/0207184 A1* | 7/2020 | Schumacher | B60H 1/0045 |
| 2020/0207326 A1* | 7/2020 | Wenger | B60H 1/00771 |
| 2020/0324617 A1* | 10/2020 | Conway | B60H 1/00428 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |

(56) References Cited

FOREIGN PATENT DOCUMENTS

| WO | 2018226857 | 12/2018 |
|---|---|---|
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System ", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,190, titled "Optimized Power Distribution to Transport Climate Control Systems Amongst One or More Electric Supply Equipment Stations", filed Sep. 9, 2020, 43 pages.
Extended European Search Report, issued in the corresponding European patent application No. 19382776.3, dated Apr. 3, 2020, 9 pages.

* cited by examiner

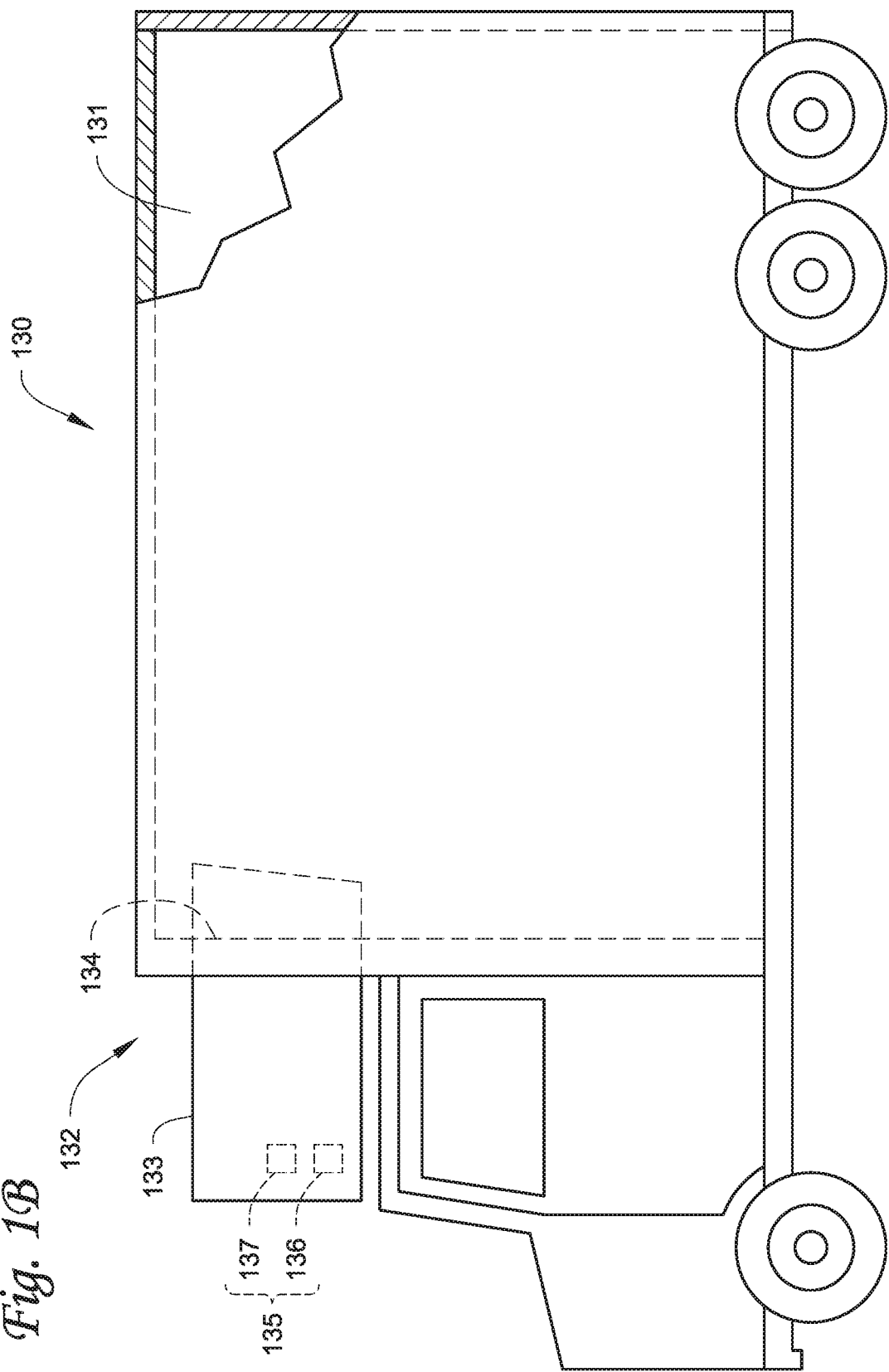

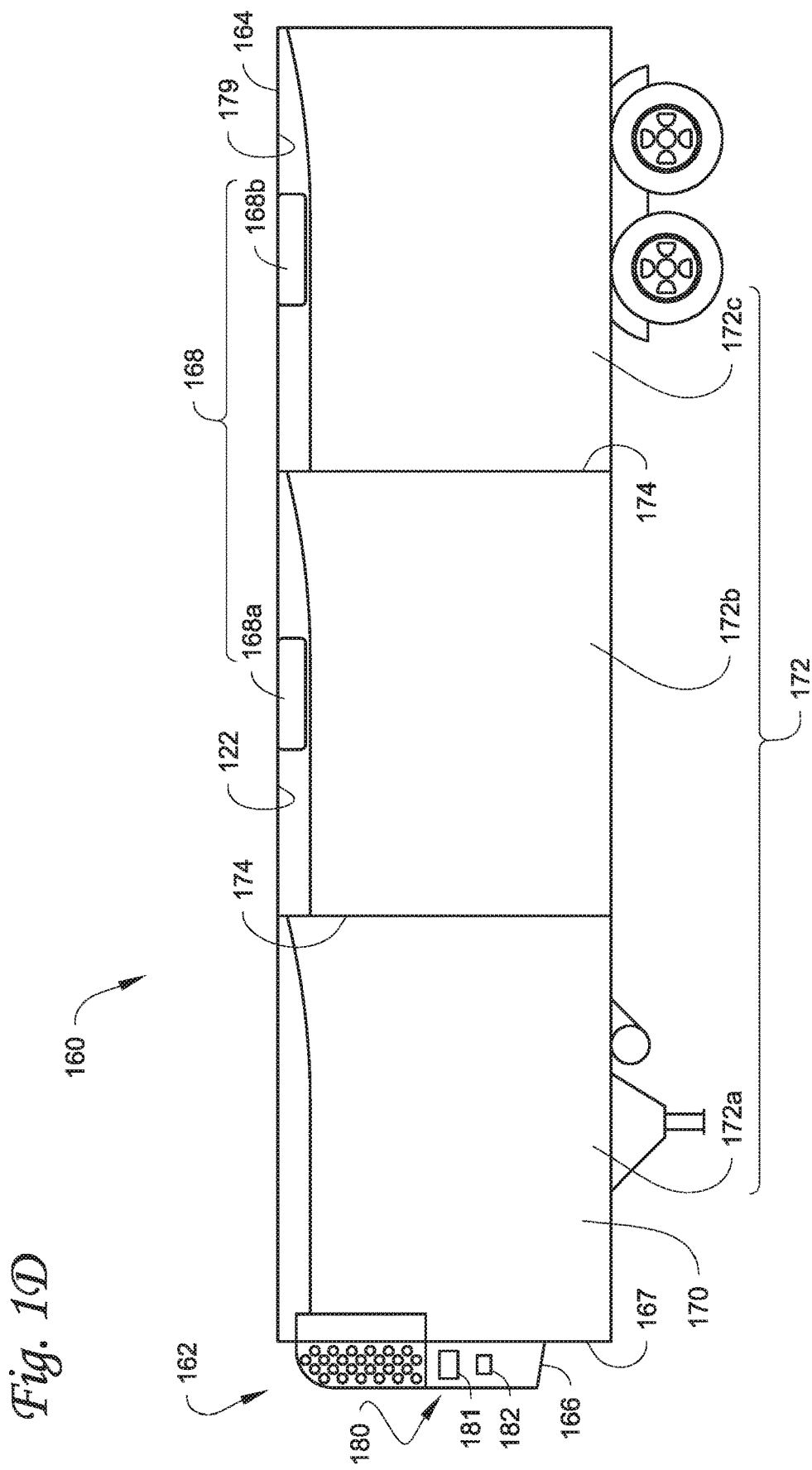

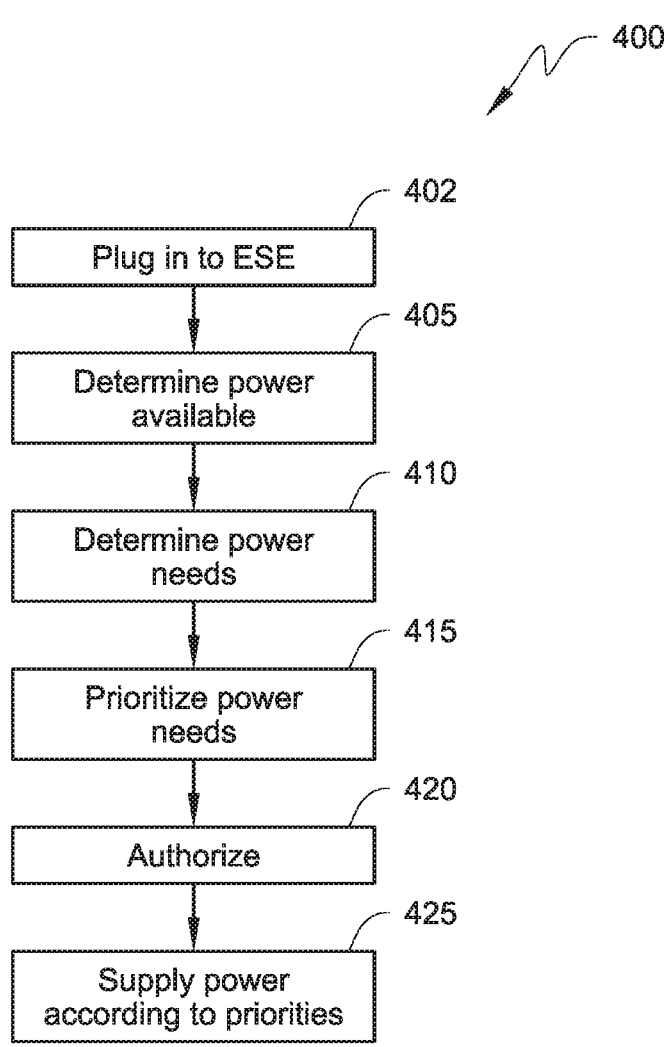

PRIORITIZED POWER DELIVERY FOR FACILITATING TRANSPORT CLIMATE CONTROL

FIELD

The technologies disclosed and recited herein pertain generally to delivering power to primary and accessory electrical components associated with a vehicle that is at least partially electrically powered, as well as to a power source of the vehicle itself.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system may include, for example, a transport refrigeration system (TRS) and/or a heating, ventilation and air conditioning (HVAC) system. The TRS may control environmental condition(s) within the climate controlled space to maintain cargo (e.g., produce, frozen foods, pharmaceuticals, etc.). The HVAC system may control environmental conditions(s) within the climate controlled space to provide passenger comfort for passengers travelling in the transport unit. In some transport units, the transport climate control system may be installed externally (e.g., on a rooftop of the transport unit, on a front wall of the transport unit, etc.).

SUMMARY

The embodiments described herein are directed to the delivering power to primary and accessory electrical components associated with a vehicle that is at least partially electrically powered, as well as to a power source of the vehicle itself.

To operate one or more of accessory electrical components in parallel to delivering power to a vehicle battery, via a power distribution unit, the embodiments described, recited, and suggested herein facilitate understanding dynamic power available to the accessory electrical components as well as the vehicle battery, and then distributing power in a prioritized manner to optimize the system for a most efficient power delivery process, with regards to power needs and power delivery time.

As defined herein, an accessory electrical component is an electrically powered accessory configured to be used with at least one of a vehicle, trailer, and a transport container.

In accordance with at least one embodiment, a method to distribute power in an electrical power delivery environment may include: detecting incoming electrical power, the incoming electrical power provided by a connection with a power source; determining power needs for a vehicle electrical storage system; determining power needs for a climate control unit used in a transport climate control system; determining power source priorities among the vehicle electrical storage system and the climate control unit based on at least the determined power needs; and apportioning the incoming electrical power between the vehicle electrical storage system and the climate control unit based on at least in part the determined power source priorities.

In accordance with at least one other embodiment, a power distribution unit is associated with a vehicle that is at least partially electrically powered and a climate control unit used in a transport climate control system that provides climate control to an internal space of the vehicle. The power distribution unit includes, at least: a power detector to detect incoming electrical power; a power meter to assess electrical power needs for electrical accessory components associated with the vehicle and electrical power needs for the climate control unit; and a power source manager to perform functions that include, at least: determine power source priorities of the electrical components associated with the vehicle and the climate control unit based on, at least, the assessed electrical power needs, and apportion the incoming electrical power among the electrical accessory components associated with the vehicle and the climate control unit based at least in part on the power source priorities.

In accordance with at least one other embodiment, a computer-readable medium stores executable instructions that, upon execution, cause a power distribution unit, which may be associated with an electrical storage system associated with a vehicle that is at least partially electrically powered and an electrical storage device of a climate control unit that provides climate control to an internal space of the vehicle to deliver power to the electrical storage system associated with the vehicle and to deliver power to the climate control unit. The power distribution unit may perform functions that include assessing real-time energy needs for the electrical storage system associated with the vehicle and real-time power needs for the climate control unit; and apportioning incoming electrical power to the electrical storage system associated with the vehicle and the climate control unit by prioritizing, at least, transport load integrity over other considerations and prioritizing power delivery to the climate control unit.

DRAWINGS

References are made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

FIG. 1B illustrates a side view of a vehicle with a transport climate control system, in accordance with at least one embodiment described herein.

FIG. 1D illustrates a side view of a climate controlled transport unit with a multi-zone transport climate control system, in accordance with at least one embodiment described herein.

Figure 2:
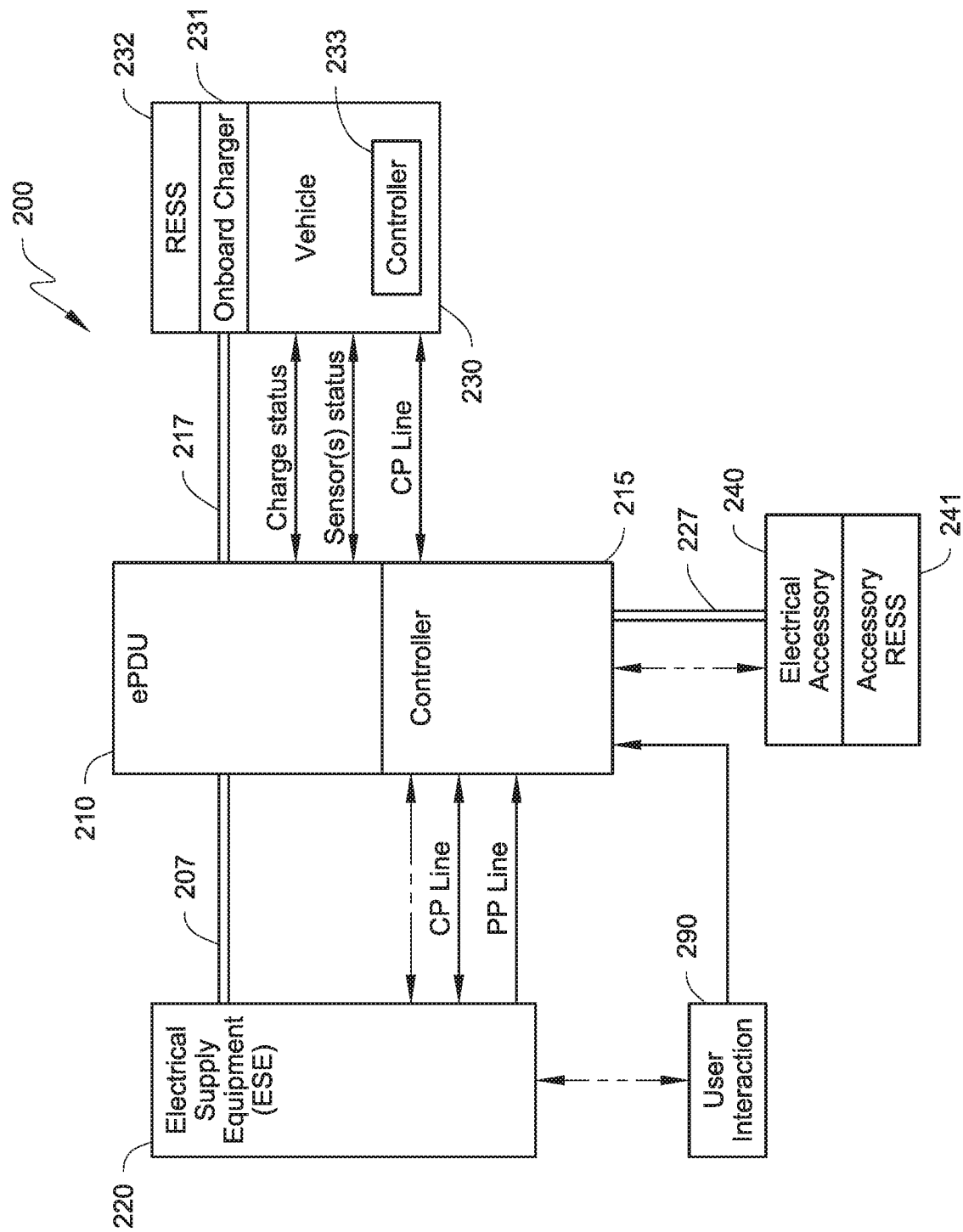

FIG. 2 schematically illustrates a power management system for a transport climate control system, in accordance with at least one embodiment described herein.

Figure 3:
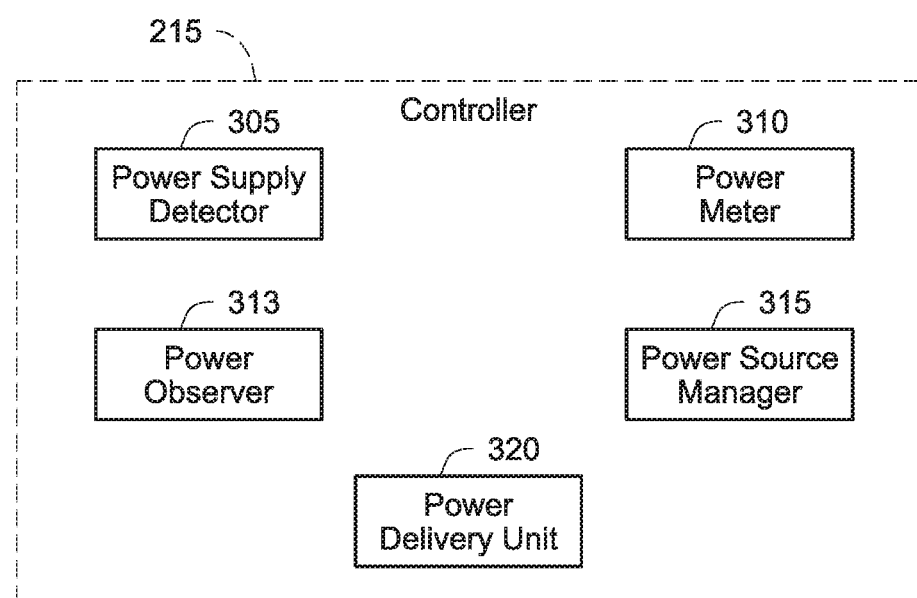

FIG. 3 illustrates a block diagram representing components of a controller corresponding to a power management system, in accordance with at least one embodiment described herein.

FIG. 4 illustrates an operational flowchart for distributing power in an electrical power delivery environment, in accordance with at least on embodiment described herein.

DETAILED DESCRIPTION

Embodiments of this disclosure relate generally to a climate control system for a transport unit. More specifically, the embodiments relate to methods and systems for providing predictive power consumption feedback for powering a transport climate control system.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM,"; U.S. application Ser. No. 16/565,110, "TRANSPORT CLIMATE CONTROL SYSTEM WITH A SELF-CONFIGURING MATRIX POWER CONVERTER,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; U.S. application Ser. No. 16/565,205, "TRANSPORT CLIMATE CONTROL SYSTEM WITH AN ACCESSORY POWER DISTRIBUTION UNIT FOR MANAGING ELECTRICALLY POWERED ACCESSORY LOADS,"; U.S. application Ser. No. 16/565,235, "AN INTERFACE SYSTEM FOR CONNECTING A VEHICLE AND AN ELECTRICALLY POWERED ACCESSORY,"; U.S. application Ser. No. 16/565,252, "DEMAND-SIDE POWER DISTRIBUTION MANAGEMENT FOR A PLURALITY OF TRANSPORT CLIMATE CONTROL SYSTEMS,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

Figure 1A:
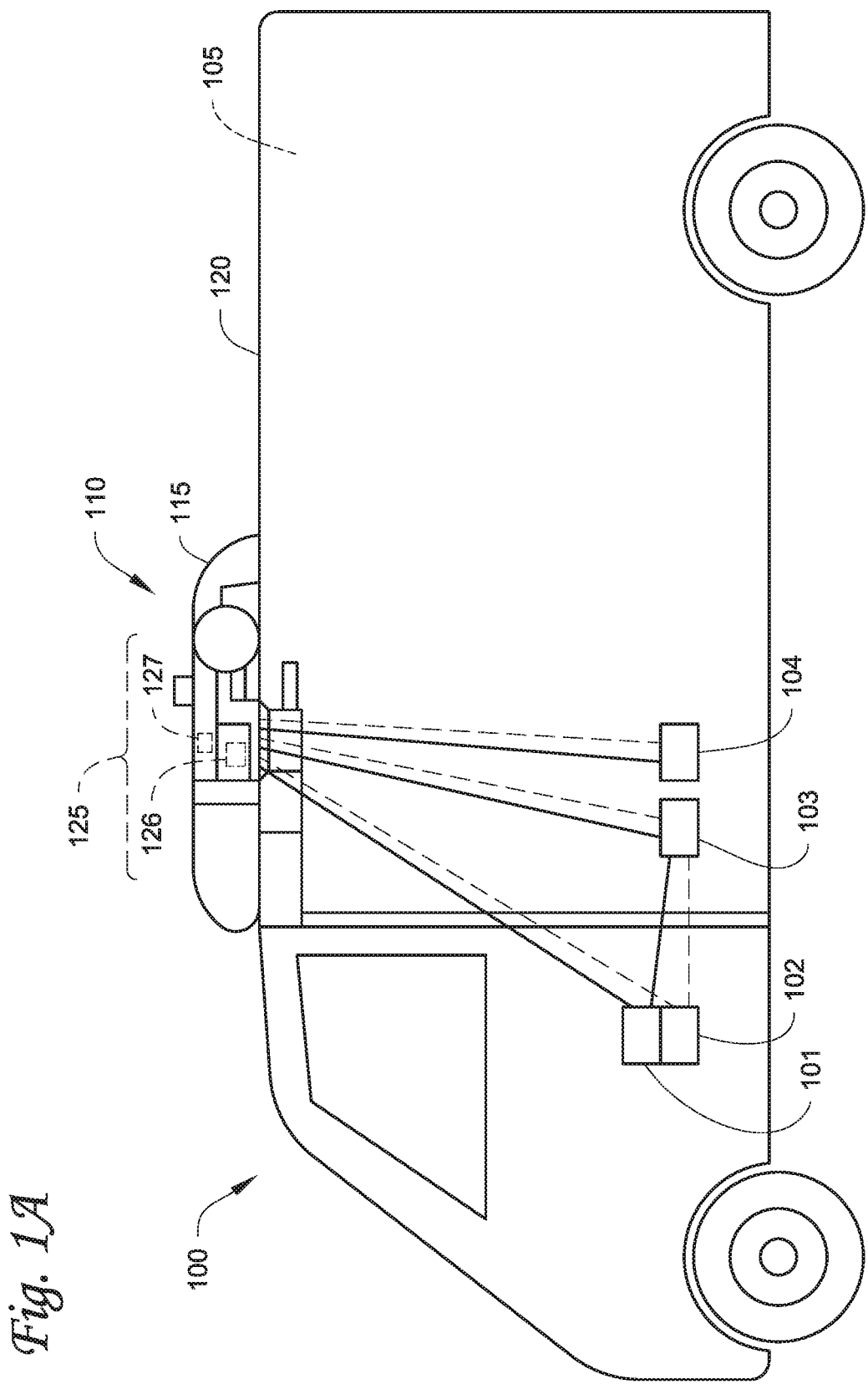
FIG. 1A illustrates a side view of a vehicle with a transport climate control system, in accordance with at least one embodiment described herein.

FIG. 1A depicts a climate-controlled van 100 that includes a climate-controlled space 105 for carrying cargo and a transport climate-control system 110 for providing climate control within the climate-controlled space 105. The transport climate-control system 110 includes a climate control unit (CCU) 115 that is mounted to a rooftop 120 of the van 100. The transport climate-control system 110 may include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but may apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network may depend upon the particular application of the principles described herein.

The climate-controlled van 100 may also include a vehicle PDU 101, a VES 102, a standard charging port 103, and/or an enhanced charging port 104 (see FIGS. 3A and 3B for the detailed description about the standard charging port and the enhanced charging port). The VES 102 may include a controller (not shown). The vehicle PDU 101 may include a controller (not shown). In one embodiment, the vehicle PDU controller may be a part of the VES controller or vice versa. In one embodiment, power may be distributed from e.g., an EVSE (not shown), via the standard charging port 103, to the vehicle PDU 101. Power may also be distributed from the vehicle PDU 101 to an electrical supply equipment (ESE, not shown) and/or to the CCU 115 (see solid lines for power lines and dotted lines for communication lines). In another embodiment, power may be distributed from e.g., an EVSE (not shown), via the enhanced charging port 104, to an ESE (not shown) and/or to the CCU 115. The ESE may then distribute power to the vehicle PDU 101 via the standard charging port 103.

FIG. 1B depicts a climate-controlled straight truck 130 that includes a climate-controlled space 131 for carrying cargo and a transport climate-control system 132. The transport climate-control system 132 includes a CCU 133 that is mounted to a front wall 134 of the climate-controlled space 131. The CCU 133 may include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network may depend upon the particular application of the principles described herein.

Figure 1C:
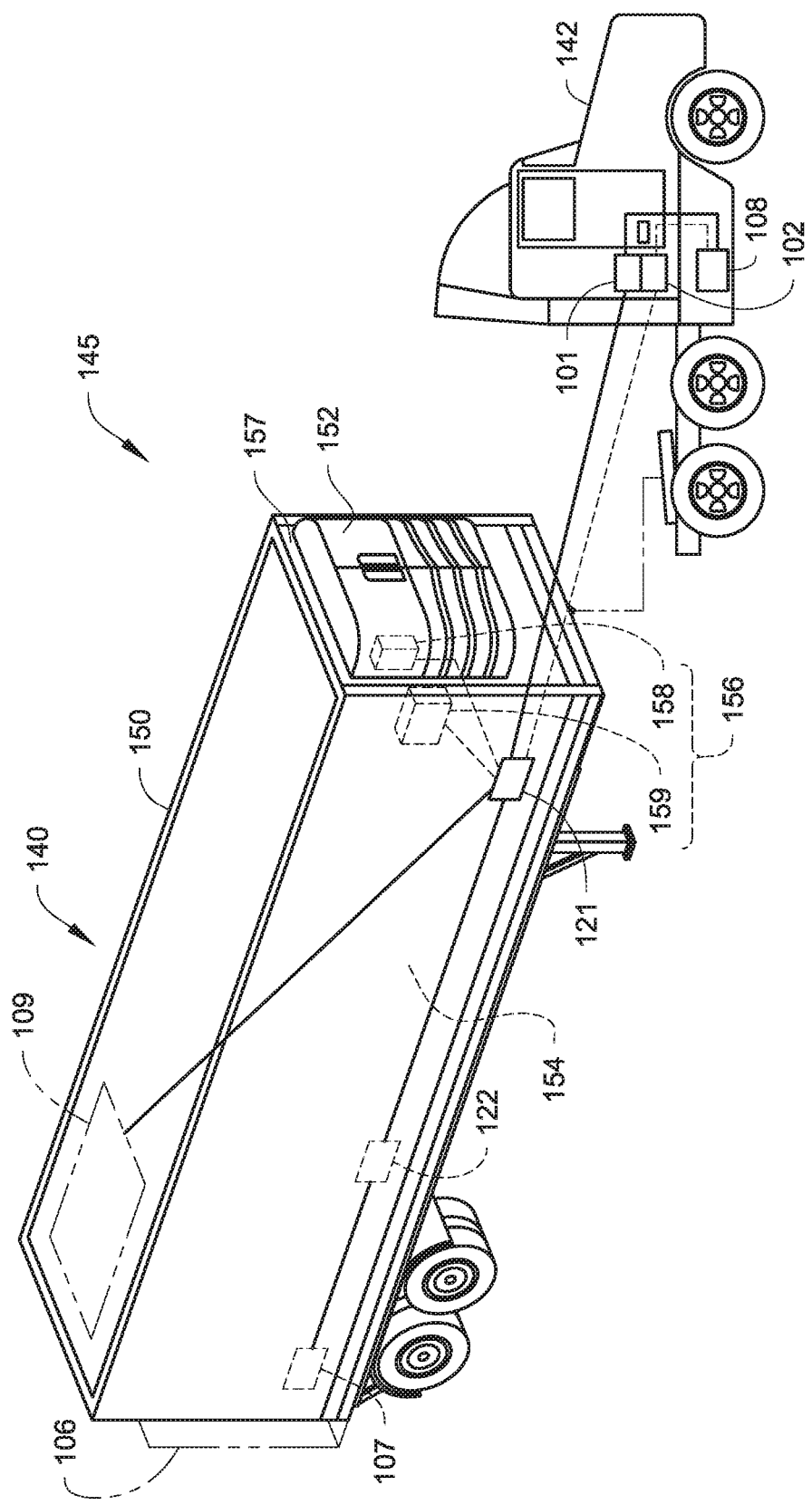
FIG. 1C illustrates a perspective view of a climate controlled transport unit, with a transport climate control system, attached to a vehicle, in accordance with at least one embodiment described herein.

It will be appreciated that similar to the climate-controlled van 100 shown in FIG. 1A, the climate-controlled straight truck 130 of FIG. 1B may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133. FIG. 1C illustrates one embodiment of a climate controlled transport unit 140 attached to a tractor 142. The climate controlled transport unit 140 includes a transport climate-control system 145 for a transport unit 150. The tractor 142 is attached to and is configured to tow the transport unit 150. The transport unit 150 shown in FIG. 1C is a trailer.

The transport climate-control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 may be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network may depend upon the particular application of the principles described herein.

In some embodiments, the tractor 142 may include an optional APU 108. The optional APU 108 may be an electric auxiliary power unit (eAPU). Also, in some embodiments, the tractor 142 may also include a vehicle PDU 101 and a VES 102 (not shown). The APU 108 may provide power to the vehicle PDU 101 for distribution. It will be appreciated that for the connections, solid lines represent electrical power lines and dotted lines represent communication lines. The climate controlled transport unit 140 may include a PDU 121 connecting to power sources (including, for example, an optional solar power source 109; an optional power source 122 such as a generator set, a fuel cell, an undermount power unit, an auxiliary battery pack, etc.; and/or an optional lift-gate battery 107, etc.) of the climate controlled transport unit 140. The PDU 121 may include a PDU controller (not shown). The PDU controller may be a part of the climate controller 156. The PDU 121 may distribute power from the power sources of the climate controlled transport unit 140 to e.g., the transport climate-control system 145. The climate controlled transport unit 140 may also include an optional lift-gate 106. The optional lift-gate battery 107 may provide power to open and/or close the lift-gate 106.

It will be appreciated that similar to the climate-controlled van 100, the climate controlled transport unit 140 attached to the tractor 142 of FIG. 1C may also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. FIG. 1D illustrates another embodiment of a climate controlled transport unit 160. The climate controlled transport unit 160 includes a multi-zone transport climate control system (MTCS) 162 for a transport unit 164 that may be towed, for example, by a tractor (not shown). It will be appreciated that the embodiments described herein are not limited to tractor and trailer units, but may apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 may be divided into a plurality of zones 172. The term "zone" means a part of an area of the climate controlled space 170 separated by walls 174. The CCU 166 may operate as a host unit and provide climate control within a first zone 172a of the climate controlled space 166. The remote unit 168a may provide climate control within a second zone 172b of the climate controlled space 170. The remote unit 168b may provide climate control within a third zone 172c of the climate controlled space 170. Accordingly, the MTCS 162 may be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 may be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network may depend upon the particular application of the principles described herein.

Figure 1E:
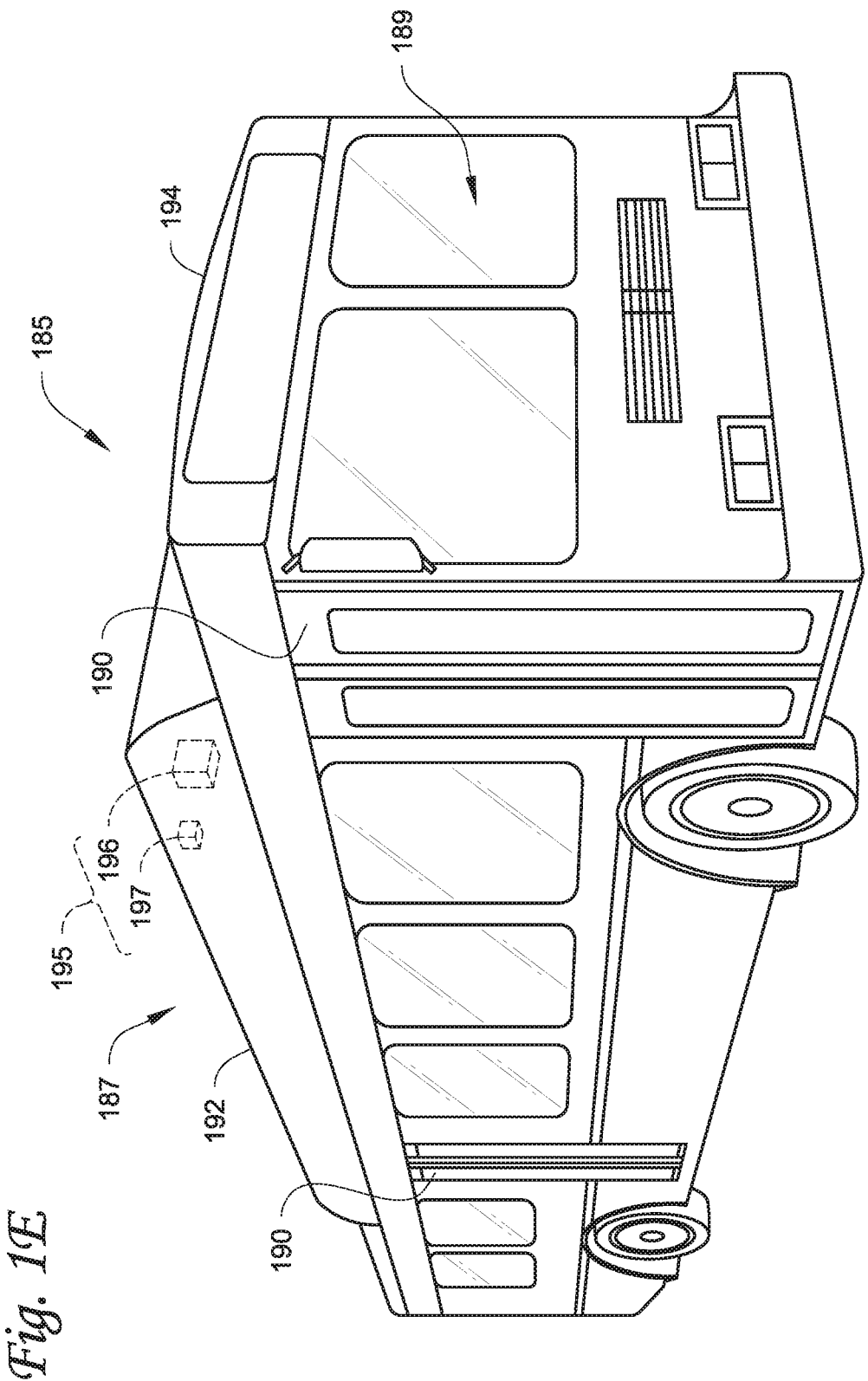
FIG. 1E illustrates a perspective view of a mass-transit vehicle including a transport climate control system, in accordance with at least one embodiment described herein.

It will be appreciated that similar to the climate-controlled van 100, the climate controlled transport unit 160 of FIG. 1D may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166. FIG. 1E is a perspective view of a vehicle 185 including a transport climate control system 187, according to one embodiment. The vehicle 185 is a mass-transit bus that may carry passenger(s) (not shown) to one or more destinations. In other embodiments, the vehicle 185 may be a school bus, railway vehicle, subway car, or other commercial vehicle that carries passengers. The vehicle 185 includes a climate controlled space (e.g., passenger compartment) 189 supported that may accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network may depend upon the particular application of the principles described herein.

It will be appreciated that similar to the climate-controlled van 100, the vehicle 185 including a transport climate control system 187 of FIG. 1E may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

FIG. 2 schematically illustrates a power management system for a transport climate-control system, in accordance with at least one embodiment described herein. As depicted, power management system 200 may include, at least, an enhanced power distribution unit (ePDU) 210, which includes controller 215. The ePDU 210 may be electrically and/or communicatively connected to electrical supply equipment 220, to vehicle 230, and/or to electrically powered accessory 240 associated with transport climate control system 241. The structure and functionality of ePDU 210 is described in more detail in U.S. application Ser. No. 16/565,205, "Transport Climate Control System with an Enhanced Power Distribution Unit for Managing Electrical Accessory Loads,".

Vehicle 230 may include at least on-board charger 231 and rechargeable energy storage system (RESS) 232. Vehicle 230 may be, as non-limiting examples, climate-controlled van 100, climate-controlled straight truck 130, tractor 142 with a climate controlled transport unit 140, and/or vehicle 185, depicted in and described above with regard to FIGS. 1A-1E.

Electrically powered accessory 240 may include electrically powered accessory RESS 241; and electrically powered accessory 240 may correspond to, as non-limiting examples, the climate control units (CCUs) 115, 133, 152, 166, and/or 192 depicted in and described above with regard to FIGS. 1A-1E. It will be appreciated that the electrically powered accessory 240 is not limited to a CCU of a transport climate control system. In other embodiments, the electrically powered accessory may be, for example, a crane attached to a vehicle, a cement mixer attached to a truck, one or more food appliances of a food truck, etc.

In accordance with at least one embodiment, the power management system 200 may further include user interface device 290, which may be implemented as a cell phone, a smart watch, a personal headset device, an application specific device, or a hybrid device that includes any of the above functions. Interface device 290 may also be implemented as a personal computer including both laptop computer and non-laptop computer configurations, including a server. The user interface device 290 may connect to and/or communicate with the electrical supply equipment 220 and the ePDU 210 either wirelessly, e.g., WiFi; via short-range communications protocol, e.g., Bluetooth or RF protocol; or via a wired connection, e.g., Internet, WAN, LAN, etc.

Electrical supply equipment 220 may be configured, programmed, or otherwise designed to supply electric power to one or more of vehicle 230 and electrically powered accessory 240, via connectors associated with ePDU 210.

The electric power supplied from the electrical supply equipment 220, via any one or more of energy power lines 207, 217, and 227 may be alternating current (AC) and/or direct current (DC) power. The supplied AC power may be either single-phase AC or three-phase AC power. The supplied DC power may be Low Voltage (LV) DC power (e.g., Class A) and/or High Voltage (HV) DC power (e.g., Class B).

As referenced herein, "low voltage" may refer to Class A of the ISO 6469-3 in the automotive environment, particularly a maximum working voltage of between 0 V and 60 V DC or between 0 V and 30 V AC.

As referenced herein, "high voltage" may refer to Class B of the ISO 6469-3 in the automotive environment, particularly a maximum working voltage of between 60 V and 1500 V DC or between 30 V and 1000 V AC.

The connectors may be any suitable connector that supports, e.g., Combined Charging System (CCS), ChadeMO, Guobiao recommended-standard 20234, Tesla Supercharger, and/or other electrical supply equipment standards.

Controller 215 may be configured, programmed, or otherwise designed to manage power inputs from at least one of, e.g., electrical supply equipment 220 and the utility power source (not shown), etc., and to prioritize and control power flow to at least one of vehicle 230 and one or more of electrical accessories 240, e.g., climate-control unit.

Controller 215 may communicate with electrical supply equipment 220 using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

Communications between controller 215 and electrical supply equipment 220 may include, e.g., a Control Pilot (CP) line and a Proximity Pilot (PP) line. The CP line may be used by, e.g., controller 215 to indicate, e.g., the power receiving level(s) of, e.g., vehicle 230 and/or electrically powered accessory 240, e.g., climate-control unit, to initiate receiving power and/or to communicate other information to electrical supply equipment 220. The PP line, i.e., Plug Present line, may further be utilized to determine a status of a plug in a socket.

Electrical supply equipment 220 may be configured, programmed, or otherwise designed to use the CP line to detect, e.g., the presence of vehicle 230 and/or electrically powered accessory 240, via ePDU 210, to communicate, e.g., the maximum and/or minimum allowable charging current and/or voltage to controller 215, and/or to control, e.g., the charging current and/or voltage, and/or the beginning and/or ending of power delivery. The PP line may prevent movement of vehicle 230 and/or electrically powered accessory 240 and to indicate, e.g., the latch release button to vehicle 230 and/or electrically powered accessory 240, via ePDU 210.

In addition, or alternatively, communications from electrical supply equipment 220 to ePDU 210 may be sent to user interface device 290. Thus, a user may review the information from electrical supply equipment 220 and send at least one request and/or at least one confirmation to electrical supply equipment 220 and/or controller 215, to make at least one adjustment and/or at least one request accordingly, via user interface device 290. In accordance with at least some embodiments, a user may authorize supplying power to one or both of the electrical energy storage system associated with vehicle 230 and the transport climate-control system, which may or may not have an energy storage device associated therewith to receive the delivered energy.

Controller 215 may be configured, programmed, or otherwise designed to communicate with a controller, e.g., controller 125, 135, 156, 180, and/or 195 of FIGS. 1A-1E, of electrically powered accessory 240, e.g., climate-control unit. If electrically powered accessory 240 indicates that electric energy is needed to power, e.g., electrically powered accessory RESS 241, electrically powered accessory 240, controller 215 may control ePDU 210 to distribute AC and/or DC power received from electrical supply equipment 220 to electrically powered accessory 240.

Controller 215 may be further configured, programmed, or otherwise designed to communicate with controller 233 of vehicle 230. In at least one embodiment, vehicle 230 may include sensors that provide data regarding, e.g., temperature, pressure, voltage, current, battery status, and/or battery power level sensor, etc., of at least on-board charger 231 and rechargeable energy storage system (RESS) 232. Controller 233 may communicate the status, e.g., status of the sensors and/or charge status, to controller 215. In at least one other embodiment, sensors associated with controller 215 may be provided to detect and facilitate reporting of, e.g., temperature, pressure, voltage, current, battery status, and/or battery charging level sensor, etc. Controller 215 may communicate, e.g., status of the sensors and/or charge status, to controller 233.

Controller 215 may be configured, programmed, or otherwise designed to communicate the information received from electrical supply equipment 220 to vehicle 230. Vehicle 230 may initiate/request power delivery from electrical supply equipment 220, via controller 215 and the CP line.

If vehicle 230 indicates that electric energy is needed to charge the vehicle 230, controller 215 may control ePDU 210 to distribute AC and/or DC power received from electrical supply equipment 220 to vehicle 230 to provide power to the on-board charger 231 and/or to charge the RESS 232.

As set forth above, controller 215 may be further configured, programmed, or otherwise designed to communicate with a controller of electrically powered accessory 240, e.g., climate-control unit. In at least one embodiment, accessory 240 may include sensors, e.g., temperature, pressure, voltage, current, battery status, and/or battery charging level of, at least, RESS 241. Electrically powered accessory 240 may communicate the status, e.g., status of the sensors and/or charge status to controller 215. As set forth above, in at least one embodiment, sensors associated with controller 215 may be provided to detect and facilitate reporting of, e.g., temperature, pressure, voltage, current, battery status, and/or battery charging level sensor, etc. Controller 215 may communicate, e.g., status of the sensors and/or charge status, to electrically powered accessory 240.

Controller 215 may be configured, programmed, or otherwise designed to communicate the information received from electrical supply equipment 220 to accessory 240. Accessory 240 may initiate/request power delivery from electrical supply equipment 220, via controller 215 and a communication portal.

If electrically powered accessory 240 indicates that electric power is needed for electrically powered accessory 240, controller 215 may control ePDU 210 to distribute AC and/or DC power received from electrical supply equipment 220 to accessory 240 to provide energy to at least RESS 241.

It will be appreciated that power demand/request from electrically powered accessory 240, e.g., for powering the transport climate control system to keep the cargo, e.g., produce, frozen foods, pharmaceuticals, etc., safe and/or fresh may have higher priority than power demand/request from vehicle 230, e.g., for delivering power to a battery associated with vehicle 230. As such, controller 215 may control ePDU 210 to distribute AC and/or DC power received from electrical supply equipment 220 to electrically powered accessory 240 first, and then to vehicle 230 if the higher priority power demand from the electrically powered accessory 240 is satisfied. That is, electrical power source priorities may include prioritizing load integrity attributable to accessory 240 over delivering power to vehicle 230.

FIG. 3 illustrates a block diagram representing components of the controller 215 corresponding to a power management system, in accordance with at least one embodiment described herein. As depicted, controller 215 may include, at least, power supply detector 305, power meter 310, power observer 313, power source manager 315, power delivery unit 320, and communications manager 325. As set forth above, the description of each successive drawing may reference features from one or more of the previous drawings to provide clearer context and a more substantive explanation of the current example embodiment. Still, the example embodiments described in the detailed description, drawings, and claims are not intended to be limiting. Further, although illustrated as discrete boxes or components, any one or more of boxes 305, 310, 313, 315, 320, and 325 may be divided into additional boxes or components, combined into fewer boxes or components, or eliminated altogether while being contemplated within the scope of the disclosed subject matter. It will be understood by those skilled in the art that each function and/or operation of the boxes or components may be implemented, individually and/or collectively, by a wide range of hardware, software, firmware, or any combination thereof.

Power supply detector 305 may refer to a component that is configured, programmed, or otherwise designed to detect an incoming electrical connection from, at least electrical supply equipment 220, via electrical power line 207. Controller 215 may communicate with electrical supply equipment 220 and a utility power source (not shown) in order to prioritize and control power flow to electrical components associated with vehicle 230, including but not limited to a vehicle battery, and to electrically powered accessories 240, including not but limited to a CCU, which may or may not have an energy storage device to receive delivered energy associated therewith.

Power supply detector 305 may detect incoming electrical connection from electrical supply equipment 220 upon power line 207 corresponding to electrical supply equipment 220 being electrically connected to ePDU 210.

Power meter 310 may refer to a component that is configured, programmed, or otherwise designed to assess electrical power needs for electrical components associated with the vehicle and electrical power needs for electrical components associated with the transport climate-control system.

Power meter 310 may read or otherwise determine power needs, i.e., power needed to reach full energy or at least sustainable energy for completion of a task, of electrical components associated with vehicle 230 including, but not limited to, rechargeable energy storage system 232, which may include a e.g., battery. As recited and described herein, vehicle 230 may communicate readings taken by and/or from sensors regarding, e.g., temperature, pressure, voltage, current, battery status, and/or battery energy level sensor, etc., to controller 215. Similarly, electrically powered accessory rechargeable energy storage system 241 may also have sensors disposed thereon to communicate readings associated with electrically powered accessory 240 regarding at least, e.g., temperature, pressure, voltage, current, battery status, and/or battery energy level of, at least, RESS 241, when the electrically powered accessory 240 is a CCU for a transport climate control system.

Thus, power meter 310 may read or otherwise determine the aforementioned power needs of the vehicle 230 based on data received from sensors corresponding to the electrical storage system associated with vehicle 230, as well as from sensors corresponding to the electrically powered accessory 240. In at least some embodiments, the sensors corresponding to electrically powered accessory are disposed on a corresponding electrical storage device.

Power observer 313 may refer to a component that is configured, programmed, or otherwise designed to calculate power currently available and forecast usage rates of power by vehicle 230 and/or a battery associated with vehicle 230, as well as calculate power currently available and forecast usage rates of power by accessory 240, e.g., climate control unit. Using such calculations, in part or in whole, power observer 313 may determine if power demands by vehicle 230 and/or accessory 240 are to be adjusted.

Power source manager 315 may refer to a component that is configured, programmed, or otherwise designed to determine power source priorities of vehicle 230 and electrically powered accessory 240 based on, at least, the assessed electrical power needs thereof, and allocate the incoming electrical power based at least in part on the power source priorities. By at least some embodiments, power source manager 315 may determine power source priorities associated with vehicle 230 and/or accessory 240 based on forecast usage by one or both, as calculated by power observer 313. Further, by the embodiments described and recited herein, the power source priorities may be alternatively determined based on power needs or forecast power usage of electrical components associated with either of vehicle 230 or accessory 240.

Power source manager 315 may prioritize delivering power to the electrical storage system associated with vehicle 230 and with electrically powered accessory 240, which may or may not have an electrical storage device associated therewith, based on transport load integrity over delivering power to, e.g., a battery of vehicle 230. That is, top priority for delivering power to the electrical storage system based on a determination of the power needs of electrically powered accessory 240, or a power demand/request therefrom, that the fate of the cargo is likely dependent upon the climate of the corresponding container when the electrically powered accessory 240 is a CCU. Alternatively, the power demand/request from electrically powered accessory 240 may be based on a forecast usage rate of power thereby. That is, when power source manager 315 determines or is informed that the cargo within a container corresponding to vehicle 230 is dependent upon a consistent climate and that maintaining such climate is dependent upon the delivery of power to accessory 240, power source manager 315 is to assign a higher priority to accessory 240, which may or may not include the delivery of power to an associated electrical storage device. By such embodiment, a CCU may correspond to electrically powered accessory 240, and provide climate control to at least one of the internal space of the vehicle, an internal space of a trailer, or an internal space of a shipping container. The structure and functionality of power source manager 315 is described in more detail in U.S. Application Ser. No. 16/565,235, "AN INTERFACE SYSTEM FOR CONNECTING A VEHICLE AND A TRANSPORT CLIMATE CONTROL SYSTEM,".

In at least one alternative embodiment or scenario for which transport load integrity is not a top priority, power source manager 315 may prioritize delivering power to vehicle 230 and/or the electrical components associated therewith based on, at least, an assessed time required for respective ones vehicle 230 and accessory 240, e.g., the transport climate-control system to be fully charged. That is, based on data received from sensors corresponding to both the electrical storage system associated with vehicle 230 and the electrical storage device associated with electrically powered accessory 240, power source manager 315 may allocate power delivery to either disproportionately based on a computation of time efficiency for delivering power to both the vehicle 230 and accessory 240. Considerations for this scenario may include, but not be limited to, a manual override of instructions to controller 215 indicating that transport load integrity is not a present risk, etc.

In at least one other alternative embodiment or scenario for which transport load integrity is not a top priority, power source manager 315 may prioritize delivering power to the electrical components associated with vehicle 230, thus allocating power to the electrical storage system associated with vehicle 230 at a disproportionately higher rate than that to electrically powered accessory 240 (e.g., a CCU). Considerations for this scenario may include, but not be limited to, a manual override of instructions to controller 215 indicating that transport load integrity is not a present risk, a manual override of instructions to controller 215 to ensure electrical operation of vehicle 230, etc.

In accordance with at least some embodiments, power source manager 315 may be configured, programmed, or otherwise designed to receive authorization before delivering power to the electrical storage system associated with vehicle 230 or the electrical storage device associated with the transport climate-control system. That is, a user may interface with at least controller 215 of ePDU 210 via an application that is installed on or running on user interface device 290 or via a web-based application. Thus, authorization for the electrical storage system or the electrical storage device to receive power may be required, via the application, prior to power is delivered.

Power delivery unit 320 may refer to a component that is configured, programmed, or otherwise designed to distribute AC and/or DC power received from electrical supply equipment 220 to electrically powered accessory 240, via electrical power line 227, and to rechargeable energy storage system 232 associated with vehicle 230, via electrical power line 217. Power delivery unit 320 may distribute power in accordance with instructions received, or data detected, from power source manager 315.

Communications manager 325 may refer to a component that is configured, programmed, or otherwise designed to facilitate data communications with electrical supply equipment 220, controller 233 of vehicle 230, and electrical accessory 240.

FIG. 4 illustrates an operational flowchart for distributing power in an electrical power delivery environment, in accordance with at least on embodiment described herein. As depicted, operational flow 400 includes functions executed by various components of controller 215 that may be included in ePDU 210 shown in FIG. 2. However, operational flow 400 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Operational flow 400 may include various operations, functions, or actions as illustrated by one or more of blocks 402, 405, 410, 415, 420, and 425. These various operations, functions, or actions may, for example, correspond to software, program code, or program instructions executable by a digital processor that causes the functions to be performed. Operations may begin at block 402.

Block 402 (Plug in to electrical supply equipment) may refer to power supply detector 305 being electrically connected to, and detecting the electrical connection, from electrical supply equipment 220. Block 402 may further, or alternatively, refer to power supply detector 305 detecting electrical power transmitted to either of an electrical storage system associated with vehicle 230 or an electrical storage device of transport climate-control system, via a CP line, also associated with vehicle 230. Operations may proceed to block 405.

Block 405 (Determine Power Available) may refer to power meter 310 and or observer 313 assessing an available amount of power for vehicle 230 and/or accessory 240, e.g., climate control unit 240. Operations may proceed to block 410.

Block 410 (Determine Power Needs) may refer to power meter 310 assessing power needs for electrical components associated with vehicle 230 and power needs for electrically powered accessory 240, e.g. climate control unit. In accordance with various embodiments recited, described, and contemplated herein, power meter 310 may read or otherwise determine power needs to reach power capacity or power to sustain operational tasks, of electrical components associated with vehicle 230 including, but not limited to, rechargeable energy storage system 232, which may include a e.g., battery.

Power meter 310 may read or otherwise determine the power needs based on data received from sensors corresponding to the electrical storage system associated with vehicle 230, as well as determining power needs from sensors corresponding to electrically powered accessory 240 or an electrical storage device associated therewith. Operations may proceed to block 415.

Block 415 (Prioritize Power Needs) may refer to power source manager 315 prioritizing power delivery to the vehicle electrical storage system of vehicle 230 and power delivery to the electrically powered accessory 240, with the prioritization being based on at least the determined power needs of the vehicle electrical storage system and the power needs of accessory 240 and/or power demands of electrical components associated with the electrically powered accessory.

In accordance with at least one embodiment, power source manager 315 may be configured, programmed, or otherwise designed to place a higher priority for delivering power to the electrically powered accessory (e.g., maintaining transport load integrity when the electrically powered accessory 240 is a climate control unit) over, at least, delivering power to an electrical storage system for vehicle 230. Such prioritization may have various motivations. For example, when the electrically powered accessory 240 is a climate control unit used in a transport climate control system, prioritization may be grounded in maintaining, e.g. freshness of produce, potency of pharmaceuticals, etc., by prioritizing sufficient power delivery to ensure climate control to at least one of the internal space of the vehicle, an internal space of a trailer, or an internal space of a shipping container.

In at least one alternative embodiment, block 415 may refer to power source manager 315 prioritizing delivering power to the electrical components associated with vehicle 230 based on, at least, an assessed time required to fully charge respective ones of the electrical components charged by the electrical storage system of vehicle 230 and of the electrical storage device of electrically powered accessory 240.

In at least one other alternative embodiment, block 415 may refer to power source manager 315 prioritizing delivering power to the electrical components associated with vehicle 230, thus delivering power to the electrical storage system associated with vehicle 230 at a disproportionately higher rate than that to the electrical storage device for the electrically powered accessory 240. Operations may proceed to block 420.

Block 420 (Authorize), in accordance with at least some embodiments, may refer to power source manager 315 receiving authorization to facilitate power delivery to the electrical storage system associated with vehicle 230 or facilitate power delivery to the electrical storage device associated with the electrically powered accessory 240, upon receiving user authorization via, e.g., a smartphone app or a web-based application on user interface device 290. Alternatively, in accordance with at least one other embodiment, controller 215 may authorize power delivery based on stored data. Operations may proceed to block 425.

Block 425 (Charge According to Priorities) may refer to power delivery unit 320 distributing AC and/or DC power received from electrical supply equipment 220 to electrically powered accessory 240, via electrical power line 227, and to rechargeable energy storage system 232 associated with vehicle 230, via electrical power line 217. Power delivery unit 320 may distribute power in accordance with instructions received, or data detected, from power source manager 315. That is, power delivery unit 320 may distribute power in accordance with the previously determined charging priorities.

Aspects

It is to be appreciated that any of the following aspects may be combined:

Aspect 1. A method to distribute power in an electrical power delivery environment, the method comprising:
  detecting incoming power provided by a connection with power source;
  determining power needs for a vehicle electrical storage system;
  determining power needs for a climate control unit used in a transport climate-control system;
  determining power source priorities among the vehicle electrical storage system and the climate-control unit based on at least the determined power needs; and
  apportioning the incoming electrical power between the vehicle electrical storage system and the climate control unit based on at least in part the determined electrical power source priorities.

Aspect 2. The method of Aspect 1, wherein the method is executed by a power distribution unit that is electrically affixed to a vehicle that is at least partially electrically powered.

Aspect 3. The method of Aspect 1 or Aspect 2, wherein the determining of electrical charging priorities includes assessing a time required to fully power the vehicle electrical storage system and the climate control unit.

Aspect 4. The method of any one of Aspects 1-3, wherein the determining of the electrical power source priorities includes placing a higher priority on delivering power to the climate control unit.

Aspect 5. The method of any one of Aspects 1-4, wherein the vehicle electrical storage system delivers power to a battery of the vehicle.

Aspect 6. The method of any one of Aspects 1-5, wherein the power is delivered to an electrical storage device of the climate control unit.

Aspect 7. The method of any one of Aspects 1-6, wherein the determining of electrical power source priorities includes prioritizing transport load integrity over delivering power to the vehicle electrical storage system.

Aspect 8. The method of any one of Aspects 1-7, wherein the apportioning includes directing at least a majority of the incoming power to the climate control unit.

Aspect 9. The method of any one of Aspects 1-8, wherein the apportioning includes directing at least some of the incoming electrical power to the vehicle electrical storage system.

Aspect 10. A power distribution unit associated with a vehicle that is at least partially electrically powered and a climate control unit used in a transport climate control system providing climate control to at least one of an internal space of the vehicle, an internal space of a trailer, and an internal space of a shipping container, the power distribution unit comprising:
  a power detector to detect an incoming electrical connection;
  a power meter to assess electrical power needs for electrical components associated with the vehicle and power needs for the climate control unit; and
  an power source manager to:
    determine power source priorities of the electrical components associated with the vehicle and the climate control unit based on, at least, the assessed power needs for the electrical components associated with the vehicle and power needs for the climate control unit, and
    apportion the incoming electrical power among the electrical components associated with the vehicle and the climate control unit based at least in part on the power source priorities.

Aspect 11. The power distribution unit of Aspect 10, wherein the power source manager is to prioritize power delivery based on, at least, an assessed time required to fully power respective ones of the electrical components of the vehicle or the climate control unit.

Aspect 12. The power distribution unit of Aspect 10 or Aspect 11, wherein the power source manager is to prioritize delivery of power to the climate control unit based on transport load integrity over delivering power to a battery of the vehicle.

Aspect 13. The power distribution unit of any one of Aspects 10-12, wherein the power source manager is to place a higher priority on delivering power to the climate control unit to provide climate control to at least one of the internal space of the vehicle, an internal space of a trailer, or an internal space of a shipping container.

Aspect 14. The power distribution unit of any one of Aspects 10-13, wherein the power source manager is to place a higher priority on delivering power to the climate control unit.

Aspect 15. The power distribution unit of any one of Aspects 10-14, wherein the power source manager is to allocate the incoming electrical power to the electrical components associated with the vehicle and the climate control unit in a calculated minimal amount of time.

Aspect 16. A computer-readable medium that stores executable instructions that, upon execution, cause a power distribution unit associated with an electrical storage system associated with a vehicle that is at least partially electrically powered and an electrical storage device of a climate control unit providing climate control to an internal space of the vehicle to deliver power to the electrical storage system associated with the vehicle and to deliver power to the climate control unit by performing functions comprising:
   assessing real-time power needs for the electrical storage system associated with the vehicle and real-time power needs for the climate control unit; and
   apportioning incoming electrical power to the electrical storage system associated with the vehicle and the electrical storage device of the climate control unit by:
      prioritizing transport load integrity over other considerations, and
      prioritizing power delivery to the climate control unit.

Aspect 17. The computer-readable medium of Aspect 16, wherein the electrical storage system associated with the electric vehicle delivers power to a vehicle battery.

Aspect 18. The computer-readable medium of Aspect 17 or Aspect 16, wherein prioritizing transport load integrity includes prioritizing delivering power to the climate control unit first.

Aspect 19. The computer-readable medium of any one of Aspects 16-18, wherein the apportioning includes delivering power to the electrical storage system associated with the vehicle and delivering power to the electrical storage device of the climate control unit in parallel.

Aspect 20. The computer-readable medium of any one of Aspects 16-19, wherein the computer-readable medium is associated with a power distribution unit.

Aspect 21. A method to distribute power in an electrical power delivery environment, the method comprising:
   detecting incoming electrical power provided by a connection with a power source;
   determining power deficiencies for a vehicle electrical storage system;
   determining power deficiencies for an electrical storage device of an electrically powered accessory configured to be used with at least one of a vehicle, trailer, and a transport container;
   determining electrical power source priorities among the vehicle electrical storage system and the electrical storage device of the electrically powered accessory based on at least the determined power deficiencies of the vehicle electrical storage system and the electrical storage device of the electrically powered accessory; and
   dividing the incoming electrical power between the vehicle electrical storage system and the energy storage device of the electrically powered accessory based on at least in part the determined electrical power source priorities.

Aspect 22. The method of Aspect 21, wherein the method is executed by a power distribution unit that is electrically affixed to a vehicle that is at least partially electrically powered.

Aspect 23. The method of Aspect 21 or Aspect 22, wherein the determining of electrical charging priorities includes assessing a time required to fully power the vehicle electrical storage system and the electrical storage device of the electrically powered accessory.

Aspect 24. The method of any one of Aspects 21-23, wherein the determining of the electrical power source priorities includes placing a higher priority on delivering power to the primary vehicle electrical storage system.

Aspect 25. The method of any one of Aspects 21-24, wherein the vehicle electrical storage system delivers power to a battery of the vehicle.

Aspect 26. The method of any one of Aspects 21-25, wherein the electrical storage device of the transport climate control system delivers power to the electrically powered accessory associated with the vehicle.

Aspect 27. The method of any one of Aspects 21-26, wherein the determining of electrical power source priorities includes prioritizing transport load integrity over delivering power to the vehicle electrical storage system of the vehicle.

Aspect 28. The method of any one of Aspects 21-27, wherein the dividing includes directing at least a majority of the incoming electrical power to the vehicle electrical storage system until the vehicle electrical storage system is fully powered.

Aspect 29. The method of any one of Aspects 21-28, wherein the dividing includes directing at least some of the incoming electrical power to the electrical storage device of the electrically powered accessory and the vehicle electrical storage system.

Aspect 30. A power distribution unit associated with a vehicle that is at least partially electrically powered and an electrically powered accessory configured to be used with at least one of a vehicle, a trailer, and a transport container, the power distribution unit comprising:
   a power detector to detect an incoming electrical connection;
   a power meter to assess electrical power needs for electrical components associated with the vehicle and electrical power needs for electrical components associated with the electrically powered accessory; and
   a power source manager to:
      determine power source priorities of the electrical components associated with the vehicle and the electrical components associated with the electrically powered accessory based on, at least, the assessed electrical power needs for the electrical components associated with the vehicle and electrical power needs for the electrical components associated with the electrically powered accessory, and
      allocate the incoming electrical power among the electrical components associated with the vehicle and the electrical components associated with the electrically powered accessory based at least in part on the power source priorities.

Aspect 31. The power distribution unit of Aspect 30, wherein the power source manager is to prioritize power delivery to the electrical components associated with the vehicle based on, at least, an assessed time required to fully power respective ones of the electrical components or the electrically powered accessory.

Aspect 32. The power distribution unit of Aspect 30 or Aspect 31, wherein the power source manager is to prioritize delivery power to the electrical components associated with the vehicle and delivering power to the electrical components associated with the electrically powered accessory based on transport load integrity over delivering power to a battery of the vehicle.

Aspect 33. The power distribution unit of any one of Aspects 30-32, wherein the power source manager is to place a higher priority on delivering power to the electrical components associated with the electrically powered accessory to provide climate control to at least one of the internal space of the vehicle, an internal space of a trailer, or an internal space of a shipping container.

Aspect 34. The power distribution unit of any one of Aspects 30-33, wherein the power source manager is to place a higher priority on delivering power to a battery of the vehicle.

Aspect 35. The power distribution unit of any one of Aspects 30-34, wherein the power source manager is to allocate the incoming electrical power to fully power the electrical components associated with the vehicle and the electrical components associated with the electrically powered accessory in a calculated minimal amount of time.

Aspect 36. A computer-readable medium that stores executable instructions that, upon execution, cause a power distribution unit associated with an electrical storage system associated with a vehicle that is at least partially electrically powered and an electrical storage device of an electrically powered accessory configured to be used with at least one of a vehicle, trailer, and a transport container, to deliver power to the electrical storage device of the electrically powered accessory, and to deliver power to electrical components associated with the electrically powered accessory by performing functions comprising:
  assessing real-time electrical charging needs for the electrical storage system associated with the vehicle and electrical storage device of the electrically powered accessory; and
  directing incoming electrical power to the electrical storage system associated with the vehicle and the electrical storage device of the electrically powered accessory by:
  prioritizing transport load integrity over other considerations, and
  prioritizing minimal charging of the electrical storage system associated with the vehicle.

Aspect 37. The computer-readable medium of Aspect 36, wherein the electrical storage system associated with the electric vehicle delivers power to a vehicle battery.

Aspect 38. The computer-readable medium of Aspect 37 or Aspect 36, wherein prioritizing transport load integrity includes prioritizing delivering power to the electrically powered accessory first.

Aspect 39. The computer-readable medium of any one of Aspects 36-38, wherein the directing the real incoming electrical power includes charging the electrical storage system associated with the vehicle, delivering power to the electrical storage device of the electrically powered accessory in parallel.

Aspect 40. The computer-readable medium of any one of Aspects 36-39, wherein the computer-readable medium is associated with a power distribution unit associated with the vehicle.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method to distribute power in an electrical power delivery environment, the method comprising:
  detecting incoming electrical power provided by a connection with a power source;
  determining power needs for a vehicle electrical storage system;
  determining power needs for a climate control unit used in a transport climate control system; and
  apportioning the incoming electrical power between the vehicle electrical storage system and the climate control unit based on the determined power needs for the climate control unit.

2. The method of claim 1, wherein the method is executed by a power distribution unit that is electrically affixed to a vehicle that is at least partially electrically powered.

3. The method of claim 1, wherein a vehicle electrical storage system delivers apportioned power to a battery of the vehicle.

4. The method of claim 1, wherein the power is delivered to an electrical storage device of the climate control unit.

5. The method of claim 1, wherein the apportioning prioritizes transport load integrity over delivering power to the vehicle electrical storage system.

6. The method of claim 1, wherein the apportioning includes directing at least a majority of the incoming electrical power to the climate control unit.

7. The method of claim 1, wherein the apportioning includes directing at least some of the incoming electrical power to the vehicle electrical storage system.

8. A power distribution unit associated with a vehicle that is at least partially electrically powered and a climate control unit used in a transport climate control system providing climate control to at least one of an internal space of the vehicle, an internal space of a trailer, and an internal space of a shipping container, the power distribution unit comprising:
  a power detector configured to detect an incoming electrical connection;

a power meter configured to assess electrical power needs for electrical components associated with the vehicle and electrical power needs for the climate control unit; and a power source manager configured to apportion the incoming electrical power among the electrical components associated with the vehicle and the climate control unit based on the determined power needs for the climate control unit.

9. The power distribution unit of claim 8, wherein the power source manager is configured to prioritize delivering power to the climate control unit based on transport load integrity over delivering power to a battery of the vehicle.

10. The power distribution unit of claim 8, wherein the power source manager is configured to place a higher priority on delivering power to the climate control unit to provide climate control to at least one of the internal space of the vehicle, an internal space of a trailer, or an internal space of a shipping container.

11. The power distribution unit of claim 8, wherein the power source manager is configured to place a higher priority on delivering power to the climate control unit.

12. A non-transitory computer-readable medium that stores executable instructions that, upon execution, cause a power distribution unit associated with an electrical storage system associated with a vehicle that is at least partially electrically powered and an electrical storage device of a climate control unit providing climate control to an internal space of the vehicle to deliver power to the electrical storage system associated with the vehicle and to deliver power to the climate control unit by performing functions comprising:

assessing real-time power needs for the electrical storage system associated with the vehicle and real-time power needs for the climate control unit; and apportioning incoming electrical power to the electrical storage system associated with the vehicle and the electrical storage device of the climate control unit by prioritizing power delivery to the climate control unit.

13. The non-transitory computer-readable medium of claim 12, wherein the electrical storage system associated with the electric vehicle delivers power to a vehicle battery.

14. The non-transitory computer-readable medium of claim 12, wherein the apportioning includes delivering power to the electrical storage system associated with the vehicle and delivering power to the electrical storage device of the climate control unit in parallel.

15. The non-transitory computer-readable medium of claim 12, wherein the computer-readable medium is associated with a power distribution unit.

* * * * *